Figure 1:
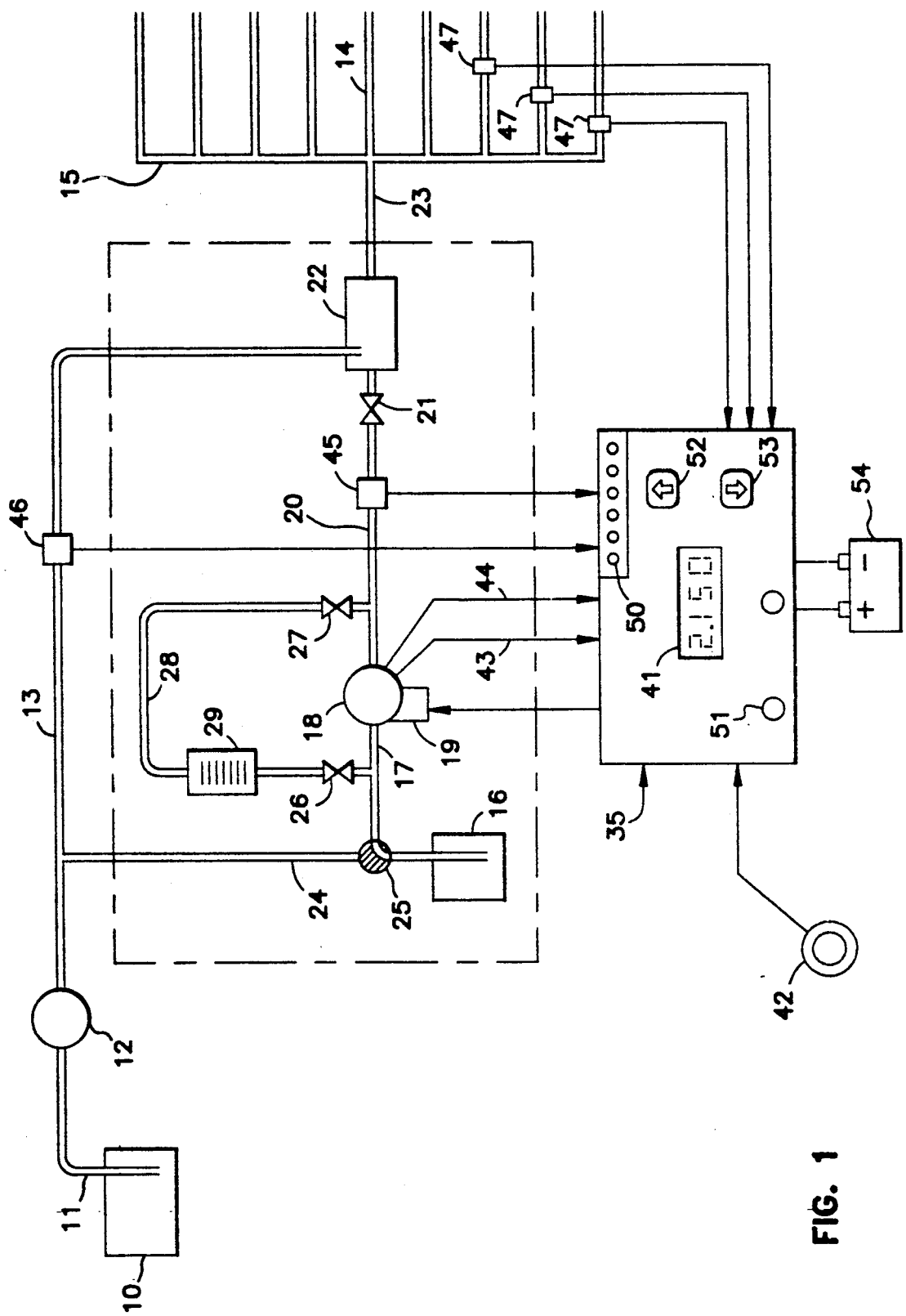

United States Patent [19]

Wallenås

[11] Patent Number: 5,014,914
[45] Date of Patent: May 14, 1991

[54] DOSE CONTROL APPARATUS FOR AGRICULTURAL TUBE SPRAYERS FOR SPREADING PESTICIDES ON FIELDS AND PLANTS

[76] Inventor: Anders Wallenås, Karstorpsvägen 26, Lomma-S-234 00, Sweden S-234 00

[21] Appl. No.: 399,456

[22] PCT Filed: Mar. 4, 1988

[86] PCT No.: PCT/SE88/00103
§ 371 Date: Sep. 26, 1989
§ 102(e) Date: Sep. 26, 1989

[87] PCT Pub. No.: WO88/06404
PCT Pub. Date: Sep. 7, 1988

[30] Foreign Application Priority Data

Mar. 4, 1987 [SE] Sweden .................................. 8700893

[51] Int. Cl.⁵ .............................................. A01M 7/00
[52] U.S. Cl. ....................................... 239/62; 239/142; 239/156; 239/172; 239/405
[58] Field of Search ...................... 239/61, 62, 69, 74, 239/142, 156, 172, 405

[56] References Cited

U.S. PATENT DOCUMENTS 3,853,272 12/1974 Decker et al. ...................... 239/155
4,714,196 12/1987 McEachern et al. ................. 239/62
4,721,245 1/1988 van Zweeden ....................... 239/74

FOREIGN PATENT DOCUMENTS 0191287 8/1986 European Pat. Off. .
0201981 11/1986 European Pat. Off. .

*Primary Examiner*—Andres Kashnikow
*Assistant Examiner*—Karen B. Merritt
*Attorney, Agent, or Firm*—Merchant & Gould

[57] ABSTRACT

The apparatus comprises at least one pesticide container (16), and a dosage pump (18) for the container or the containers, respectively, or for each container this pump or each of the existing pumps comprising a step motor controlled precision pump of the radial type which is connected via a pressure and check valve (21) to a mixing chamber (22) to be connected to one or more nozzle ramps (14) and having an inlet for water, to which the pesticide is to be added. The dose control apparatus also comprises a control unit (35) for adjusting the pump flow or the pump flows, respectively, in dependence on definite parameters, the driving speed being one.

6 Claims, 2 Drawing Sheets

DOSE CONTROL APPARATUS FOR AGRICULTURAL TUBE SPRAYERS FOR SPREADING PESTICIDES ON FIELDS AND PLANTS

BACKGROUND OF THE INVENTION

1. Field of the Invention

The invention relates to an apparatus for agricultural sprayers for spreading pesticides on fields and plants, e.g. on standing crops, in orchards, or in vineyards, comprising at least one pesticide container, a dosage pump for the container or the containers, respectively, or for each container, and a control unit for adjusting the pump flow or the pump flows, respectively, in dependence on definite parameters, the driving speed being one.

2. Description of the Prior Art

Dose control apparatus of this type is used on agricultural sprayers which in the tank provided thereon carry not a mixture of plasticide and water in a predetermined mixture ratio but pure water only, the pesticide being admixed to the water flow to one or more nozzle ramps. The advantage of this system is primarily that the dosage, i.e. the mixture ratio between water and pesticide can be changed during driving of the sprayer to be adjusted to local variations in the need of pesticide on the field or plant region which is being treated, and that the tank of the sprayer contains pure water and will never be contaminated by pesticide so that it is not necessary to clean the tank when changing from one pesticide to another or at changeover Lo spreading of other substances than pesticides, such as fertilizers.

In known embodiments these dose control apparatuses do not operate in a satisfactory way, however, because the precision of the dose control is deficient so that the mixture ration cannot be adjusted and maintained with the accuracy required and the mixture of water and pesticide will not be homogeneous so that the pesticide concentration will vary in different parts of the nozzle ramp or ramps.

SUMMARY OF THE INVENTION

The purpose of the invention is to provide a dose control apparatus which operates with a closed system and provides a homogeneous mixture of pesticide and water at an accurately adjustable and reproducible dose control of the pesticide.

In this connection an accurately adjustable and reproducible dose control means that the dosage of pesticide determined for a specific purpose of the spraying shall be kept constant within close limits with a variation of the pesticide which is of a maximum order of 0.5%, and with the possibility of reproducing the adjustment within the same limit values, in order that too much or too little pesticide will not be supplied to the ground or the plants but just the amount considered optimal because too much pesticide overloads the environment and to little pesticide may give a reduced or event spoiled harvest.

By making the mixture homogeneous detrimental local concentrations of the pesticide on the ground or on the plants by uneven distribution of the pesticide from the nozzle ramp or ramps will be avoided.

The dose control apparatus being a closed system means that the personnel handling the sprayer will not contact the pesticide and that the pesticide cannot be deposited outside the dose control apparatus through other channels than via the nozzle ramp or ramps. Thus, extensive requirements with regard to protection of personnel and environment can be met.

BRIEF DESCRIPTION OF THE DRAWINGS

In order to explain the invention in more detail an embodiment thereof will be described below reference being made to the accompanying drawings in which FIG. 1 is an elementary diagram of the dose control apparatus of the invention, FIG. 2 is an axial cross sectional view of the mixing chamber included in the dose control apparatus, FIG. 3 is a cross sectional view of the mixing chamber in FIG. 2, and FIG. 4 is a block diagram of the control unit.

DETAILED DESCRIPTION OF THE PREFERRED EMBODIMENTS

In FIG. 1 the dose control apparatus of the invention is shown together with those elements of the sprayer which are connected to the dose control apparatus but do not form part thereof. The portion of the dose control apparatus, operating with liquid, being located inside a dot-and-dash line and the connected elements of the sprayer being located outside said line. These elements comprise a water tank 10 having a suction conduit 11 which is connected to a water pump 12, usually a conventional piston membrane pump driven directly from the power output shaft of the tractor towing or carrying the sprayer. A conduit 13 for pressurized water is connected to the pressure side of the pump. Moreover, these elements comprise a number of nozzle ramps 14 with a distributing conduit 15. The ramps can be selectively connectible in a conventional manner.

The dose control apparatus comprises a container 16 for the pesticide to be spread by means of the sprayer, but several such containers, preferably three, may be provided such that several pesticides of different kinds can be carried on the sprayer. A suction conduit 17 is connected to the container. The suction conduit is connected to a dosage pump 18 which can also be driven directly from the power output shaft of the tractor, and according to the invention said pump shall comprise a precision dosage pump of the radial type the displacement of which can be adjusted with an accuracy of 0.5%; said adjustment can be repeated at the same accuracy. The adjustment of the displacement is effected by changing the eccentricity of the crank shaft of the pump by displacing a chamfered slide which is connected via a screw transmission to a drive motor. The adjusting means comprising the motor and the associated transmission is indicated at 19 in FIG. 1. The adjustment motor of the dose control apparatus of the invention shall comprise a step motor in order to achieve the desired precision of the adjustment. For example, the screw transmission between the step motor and the slide can have a pitch of 1.5 mm each step of a step motor making 200 steps for each revolution providing a displacement of the slide of 0.0075 mm for each step. If several containers are provided the suction conduit 17 can be provided with suitable switching means for alternative connection of the containers to the suction conduit such that one container only at the time is connected, or a seperate dosage pump can be provided for each container.

A pressure conduit 20 is connected to the pressure side of the dosage pump 18 and is connected via an injection valve 21 to a mixing chamber 22, also the pressure conduit 13 from the water pump being connected to said chamber. The injection valve 21 is an overpressure and check valve which controls the pressure of the pesticide supplied to the mixing chamber. This pressure should be higher than the water pressure in the pressure conduit 20. In the mixing chamber 22, the construction of which will be described in more detail below, the mixture of pesticide and water is discharged through an outlet conduit 23 which connects to the distributing conduit 15 with the nozzle ramps 14.

The portion of the dose control apparatus which operates with liquid also comprises a conduit 24 between the pressure conduit 13 and the suction conduit 17 the connection of the conduit 24 to the suction conduit being provided by means of a three-way valve 25 such that the suction conduit 17 can be connected alternatively to the container 16 and the conduit 24. Moreover, a shunt conduit 28 is connected over the dosage pump via shut-off valves 26 and 27 a calibrated measuring vessel 29 being provided in the shunt conduit.

Figure 2:
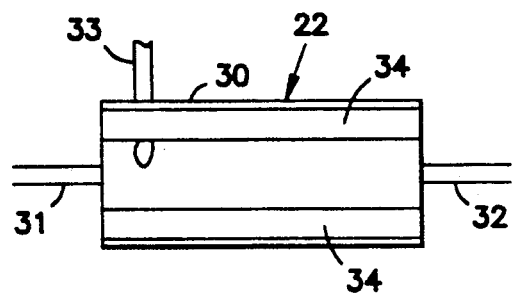
Figure 3:
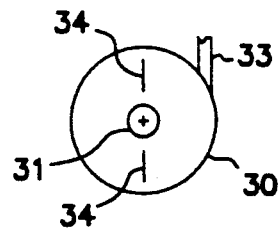

The mixing chamber 22 is shown in more detail in FIGS. 2 and 3, and reference is now made to said figures. The mixing chamber comprises a cylinder 30 having an axial inlet 31 at one end thereof and an axial outlet 32 at the other end thereof, the inlet being connected to the pressure conduit 20 for pesticide via the nozzle valve 21 and the outlet being connected to the outlet conduit 23. Adjacent the inlet end the mixing chamber also has a tangential inlet 33 which is connected to the pressure conduit 13 for water. Inside the mixing chamber two diametrically opposite axial bars 34 are provided which extend from one end to the other and are located at a radial distance from the surrounding curved wall. The bars extend radially towards the center axis of the mixing chamber to terminate at a substantial distance therefrom. Thus, a circulating movement is imparted to the water entering the mixing chamber under pressure through the inlet 33, but the movement thereof will be interrupted by the bars 34 such that there will be obtained in the mixing chamber a strong turbulence when the water is flowing towards the outlet 32 the pesticide entering axially through the inlet 31 at the same time being intimately mixed with the water. Thus, a homogeneous mixture of pesticide and water will be discharged from the mixing chamber through the outlet conduit 23. More bars than two of the type described can be provided in the mixing chamber but the embodiment disclosed having two bars has been found to meet the demand of providing a homogeneous mixture.

Figure 4:
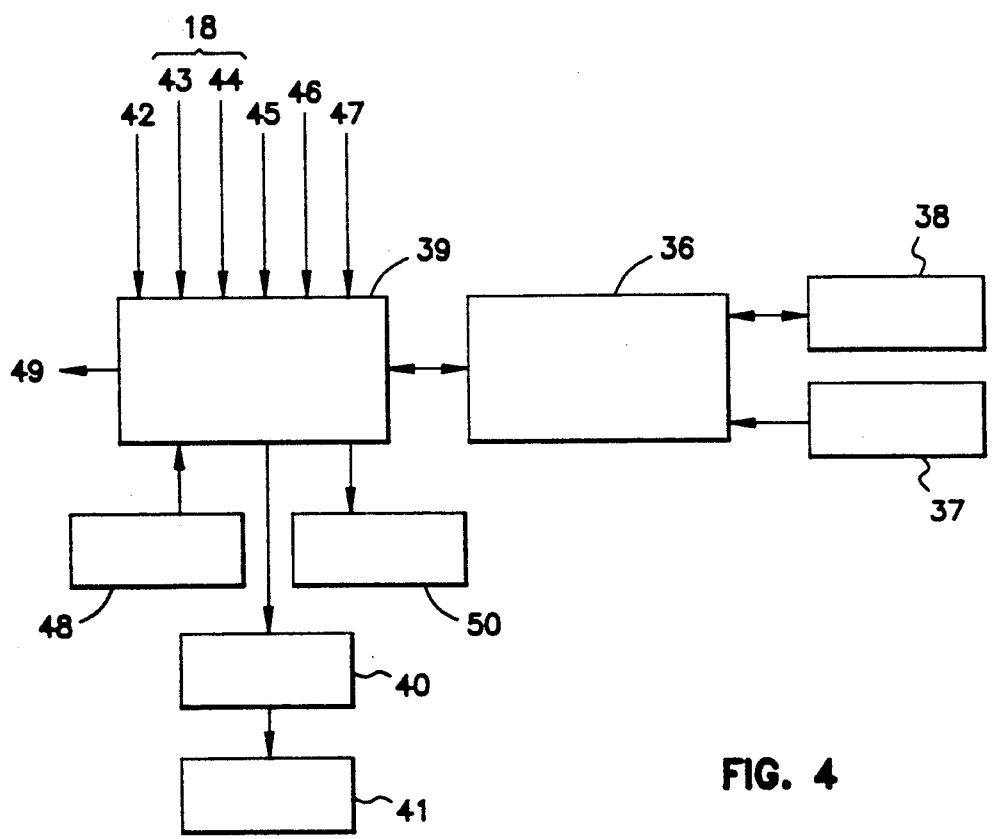

In FIG. 1. there is also shown a control unit 35. This control unit is an electronic control unit and is constructed in the manner shown in FIG. 4. The unit comprises as a central component a microprocessor 36 having a PROM 37 for storing programs and a RAM 38 for storing data. The microprocessor receives and supplies signals via a unit 39 having inlet and outlet gates. A display 41 is connected to said unit via a drive circuit 40. Moreover, a number of sensors are connected to the unit 39. Referring to FIGS. 1 and 2 such sensors include a wheel sensor 42 rolling on the ground when the sprayer is moving over a field, and provides a signal which represents the driving seed. From this signal the treated area can be calculated in the microprocessor by the signal being combined with a time signal and with a constant factor representing the operating width of the sprayer. From the dosage pump 18 the unit 39 receives two signals: one signal 43 representing the rotational speed of the input shaft of the dosage pump, and one signal 44 representing the actual adjustment position when the dose control apparatus is started up. Also a signal from a sensor 45 in the pressure conduit 20 for the pesticide is supplied to the unit 39 and this signal indicates if the pressure conduit 20 is pressurized or not, i.e. if the dosage pump 18 supplies pesticide or not. A sensor 46 in the pressure conduit 13 from the water pump 12 supplies a signal which indicates the amount of pure water supplied from the pump, to the unit 39 which, finally, receives signals also from a number of ramp sensors 47 indicating the number of connected nozzle ramps.

From a keyboard 48 which is also connected to the unit 39 manually initiated signals can be supplied to the microprocessor.

From the unit 39 a signal 49 is supplied to the adjustment means 19 for the dosage pump for adjustment of the displacement thereof. If several dosage pumps are provided signals are supplied from the unit 39 selectively to each pump via automation means. Finally, also indicator lamps 50 receive signals from the unit 39.

A switch 51 is provided on the control unit, FIG. 1, and by means of this switch the display 41 can be switched to show the different parameters which are of interest in connection with the operation of the sprayer, and the keyboard 48 can be switched for adjustment of one or the other of these parameters. For example, it is possible to switch to programmed dose control, actual dosage, driving speed, sprayed area in hectares, zero adjustment of the indicated area, remaining distance to be covered, and the amount of water in liters per hectare. The key board according to FIG. 1 includes two keys 52 and 53 one for increasing and the other for decreasing the parameter controlled for the time being. The indicator lamps can be provided in the number desired to indicate different conditions in the dose control apparatus, which need not be specified in more detail.

The control unit 35 is supplied from a power source 54 preferably from the battery of the tractor.

When the sprayer is put into use the valve 25 is in the position in which the suction conduit 17 is connected to the container 16 and the connection to the pressure conduit 13 through the conduit 24 is closed, and the two shut-off valves 26 and 27 are closed. By means of the signal 44 from the pump 18 the adjustment means 19 will be synchronized with the control unit in the conventional manner by the adjustment means being set to zero of any other optional position and then is adjusted to the position determined by the adjusted position calculated by the control unit. A desired value of the amount of pesticide expressed as liters per hectare to be mixed with the water is set on the keyboard 48, which can be done by manipulating the keys 52 and 53. The control unit supplies a signal to the adjustment means 19 for adjustment of the desired amount. This adjustment is effected by the control unit supplying pulses to the adjustment means the step motor forming part thereof, being rotated in one direction or the other one step for each pulse. This direct adjustment of the adjustment means from the control unit provides a extraordinary great accuracy in the adjustment if there is chosen e.g. the adjustment for each step which was calculated above. During driving of the sprayer it is possible to check at any time that the amount set is dosed, and it is also possible to increase or decrease the amount during driving if this is considered proper in view of the local ground and plant conditions.

In order to check the dosage of the pesticide it is also possible to open the shut-off valve 27 such that the pesticide will be pumped into the vessel 29 which is a measuring vessel having a suitable scale. During measuring the sprayer is driven over a distance corresponding to one hectare or a definite fraction of an hectare or the measuring wheel 42 is rotated the number of revolutions corresponding to the desired area the amount of pesticide in the measuring vessel 28 then being measured. The pesticide collected in the measuring vessel can be returned to the container by opening the shut-off valve 26.

In order to cleanse the dose control apparatus the three-way valve 25 is adjusted to the position in which the connection with the container 16 is closed off and the suction conduit 17 of the dosage pump 18 is connected through the conduit 24 with the pressure conduit 13 of the water pump 12. Then, the dosage pump will pump water for rinsing said pump and the conduits connected therewith. This rinsing then can include also the calibration system connected via the valves 26 and 27. The calibration described above also can be effected by using water instead of pesticide if the valve 25 during calibration connects the suction conduit 17 with the pressure conduit 13.

The embodiment described can be modified within the scope of the accompanying claims e.g. by simplifying the electronic system by limiting such system to indication of the amount of added pesticide only, or by further extension of the electronic system so that such system provides indication and adjustment of further parameters of the dose control apparatus. It was mentioned above that several containers 16 with associated auxilliary apparatus can be provided and it is also possible to exclude the means for calibration and cleansing without departing from the inventive concept.

I claim:

1. Dose control apparatus for agricultural sprayers for spreading pesticides on fields and plants, comprising at least one pesticide container, at least one precision dosage pump of the radial type having a displacement control member, a step motor, a linear transmission between the step motor and the displacement control member, a mixing chamber having an axial inlet for pesticide at one end thereof and a tangential inlet for water adjacent said end to which the pesticide is to be added, and an axial outlet for the mixture of pesticide and water at the other end of the vessel, said outlet being adapted for connection to at least one nozzle ramp, a connection between the dosage pump and the mixing chamber, a pressure and check valve in said connection, and a control unit for controlling the pump flow in dependence of definite parameters, the driving speed being one, said control unit supplying control pulses directly to the step motor.

2. Dose control apparatus as in claim 1 wherein radial bars are provided in the cylindrical vessel extending axially therein between the opposite ends of the vessel spaced from the curved wall of the vessel, said bars having such a radial dimension that they terminate at a substantial distance from the center axis of the cylindrical vessel.

3. Dose control apparatus as in claim 2 wherein two diametrically opposite bars are provided in the mixing vessel.

4. Dose control apparatus as in claim 1 comprising a shunt connection over the dosage pump, shut-off valves for connecting and disconnecting the shunt connection, and a calibrated measuring vessel located in the shunt connection.

5. Dose control apparatus as in claim 1 wherein the suction side of the dosage pump can be connected alternatively to the water inlet.

6. Dose control apparatus as in claim 1 wherein the control unit comprises a microprocessor and a sensor for the supply of a signal representing the driving speed of the sprayer to the microprocessor which can be programmed manually as to the adjustment of the amount of pesticide per area unit supplied by means of the dosage pump.

* * * * *

UNITED STATES PATENT AND TRADEMARK OFFICE
CERTIFICATE OF CORRECTION

PATENT NO. : 5,014,914

DATED : May 14, 1991

INVENTOR(S) : Anders Wallenas

It is certified that error appears in the above-identified patent and that said Letters Patent is hereby corrected as shown below:

ON THE TITLE PAGE AND IN COLUMN 1:
In the title delete "TUBE".

Signed and Sealed this

Twenty-fourth Day of November, 1992

Attest:

DOUGLAS B. COMER

*Attesting Officer*   *Acting Commissioner of Patents and Trademarks*